R. SAENGER.
METHOD OF MAKING LACE HAIR NETS.
APPLICATION FILED NOV. 14, 1918.
1,300,881. Patented Apr. 15, 1919.
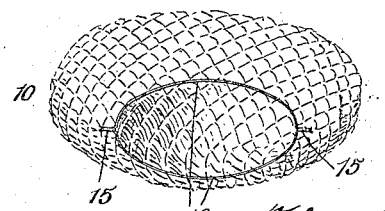
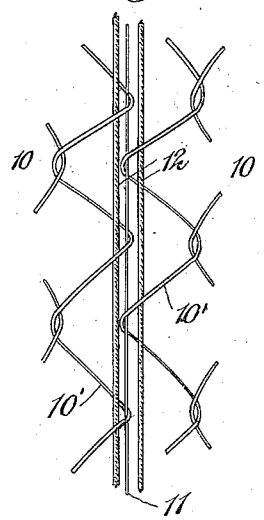
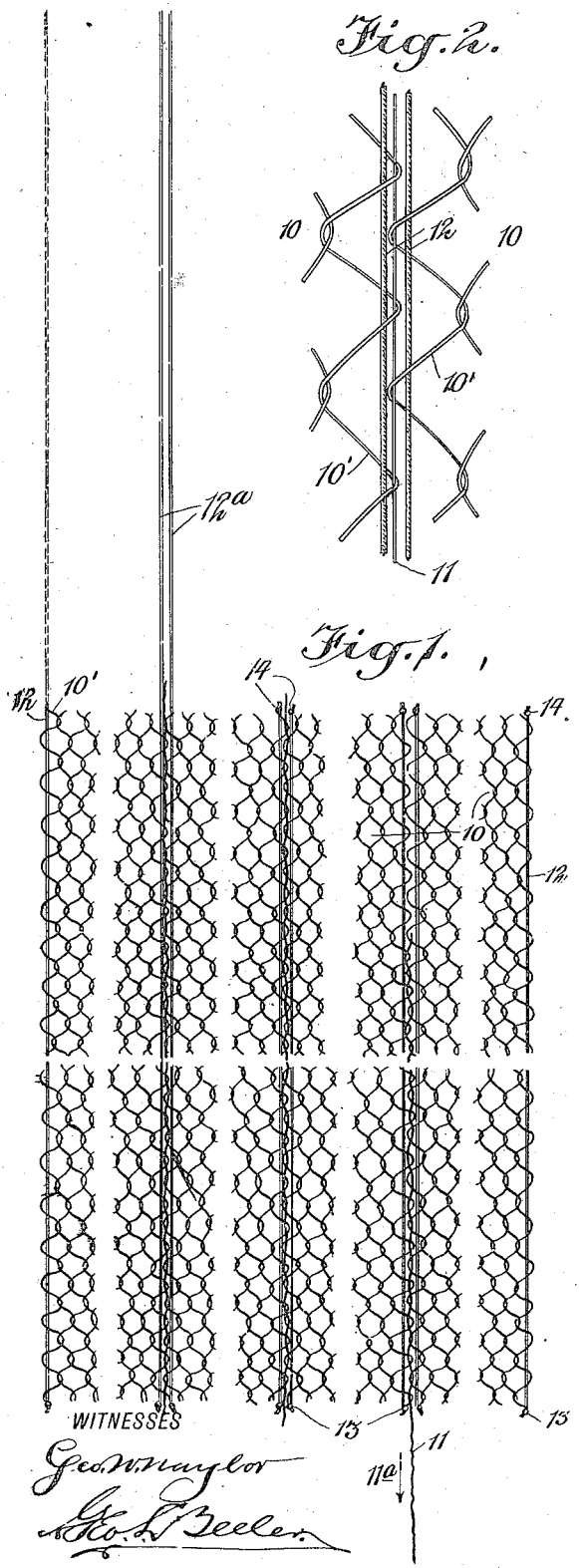
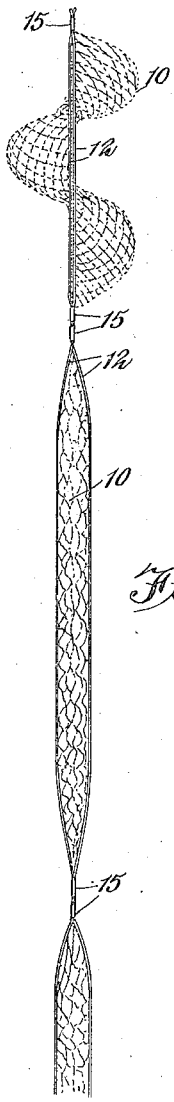
INVENTOR
Rudolf Saenger
BY
ATTORNEYS

UNITED STATES PATENT OFFICE.

RUDOLF SAENGER, OF NEW YORK, N. Y.

METHOD OF MAKING LACE HAIR-NETS.

1,300,881.

Specification of Letters Patent.

Patented Apr. 15, 1919.

Application filed November 14, 1918. Serial No. 262,482.

*To all whom it may concern:*

Be it known that I, RUDOLF SAENGER, a citizen of Germany, and a resident of the city of New York, borough of Manhattan, in the county and State of New York, have invented a new and Improved Method of Making Lace Hair-Nets, of which the following is a full, clear, and exact description.

This invention relates to the process or method of making in a rapid, uniform, cheap, and efficient manner ladies' lace hair nets, and has particular reference to that type of nets characterized by the use of an elastic cord laced into the rim or edge of the net and having the inherent quality of puckering or gathering that portion of the net so as to hold it automatically around the head.

In the manufacture of hair nets as ordinarily practised the lace is woven in long pieces and of sufficient width to comprise a considerable number of net strips, the strips being attached removably or separably during the weaving of the piece, by the introduction of a draw-thread into the adjacent selvages of each to adjacent net strips. Next the entire piece is cut transversely into lengths for example twenty-two inches in length, such length being a suggested length of net strip for a single net, and then the draw-threads are removed by the operator thereby separating all of the net strips or units from one another. The operator then treating each net unit separately next ties a simple knot or half stitch in each end or raw edge of the net unit, and finally by the use of a bodkin or the like laces or threads an elastic cord of about twenty-two inches in length along both exposed selvages, as for example from one knot along one selvage past the opposite knot, and thence back along the other selvage to the starting point. Since the elastic cord employed is of a lengh approximating that of both selvages it follows that the introduction of the cord and fastening the ends thereof together by knotting or otherwise, the selvage portions of the net are gathered or puckered so as to reduce the length thereof by one half and thereby the net as a whole is formed into bag shape and ready for use. This old process obviously is tedious and slow, and consequently very expensive.

In the practice of my invention I am able to manufacture a large number of hair nets at the same time or in a series as distinguished from separate or individual net procedure. Consequently the operation is facilitated many fold and the finished product is neater and more satisfactory in other respects than the nets heretofore made.

In the further specific description of my improved method reference is to be had to the accompanying drawings in which like reference characters refer to similar parts in the several views, and of which Figure 1 is a fragmentary plan view of a piece of lace involving a plurality of net strips, and indicating various steps or substeps of my process.

Fig. 2 is an enlarged detail view indicating the means for attaching adjacent selvage edges of adjacent net strips together separably, and indicating also the elastic cords woven therein.

Fig. 3 shows a short portion of a net strip, and indicates succeeding steps in the treatment thereof; and Fig. 4 is a diagrammatic representation of a finished net.

Referring now more specifically to the drawings, Fig. 1 of which indicates a piece of lace broken longitudinally as well as transversely to conserve space and to represent the general character of the piece as a whole, I weave or manufacture the piece of lace so as to include a plurality of parallel net strips 10 of any suitable length, but the width of each strip as heretofore corresponds to the width of the net produced. In other words the width of the net strip from one selvage to the other is sufficient to reach across the head of hair from one side of the head to the other when put under a reasonable amount of stretch. Adjacent net strips 10 as already described are so woven that their selvages 10' meet or overlap so as to be held separably together by means of a draw-thread 11. In addition to this draw-thread along the meeting selvages I introduce an elastic cord 12 in or along each selvage. In other words there are two cords 12 arranged along close to each draw-thread throughout the piece when the lace is woven or made.

In the next step of my method I lay or stretch a piece of the woven lace of any suitable length upon a long bench or table thereby laying the piece substantially flat and with the net strips 10 having a relation to one another somewhat as indicated in Fig. 1 so that they shall be easily distinguished from one another, and with the draw-threads and elastic cords plainly discernible. Obviously in laying or stretching the piece of lace as a whole upon the bench or table one end thereof will be fastened by some suitable means so as to be held firmly, and the ends of the elastic cords are anchored as by means of pins 13. It is to be understood that up to this moment the cords 12 are not stretched beyond their normal length. With the piece so laid out and fastened on the bench or table the opposite or free ends of the cords 12 are drawn out or stretched to double their normal length as indicated at 12ª. This operation is both rapid and easy, and the stretching of the cords is not materially resisted by the contact with the other portions of the lace since the cords may be drawn freely lengthwise thereof. With the cords thus put under stretch they are then fastened by means of pins 14, or their equivalent, at the end of the lace remote from the pins 13, and the free halves of the cords are cut off and saved and subsequently used for the manufacture of lace or other purposes. The status as thus far described is now represented at the middle portion of Fig. 1, the piece of lace except for the stretched cords 12 being in the form in which it is placed or stretched upon the bench. The fastening of the elastic cords 12 by means of the pins 13 and 14 serves to hold the lace as a whole steady in flat position on the bench for the operation of the next steps.

I next separate adjacent net strips 10 by withdrawing the draw-threads 11 as shown by the arrow 11ª.

I next release the anchorage or fasteners 13 and 14 and treat each net strip with the stretched cords 12 along its selvages as a separate unit, and for the convenience in the further handling thereof such unit may be wound upon a roll or spool, the cords 12 for this purpose being collapsed with the lace between them toward each other forming a relatively slender rope or body of fabric. It will be understood that from the nature of the method of stretching the elastic cords described above and shown at the left side of Fig. 1 all of that portion of each cord from one end of the lace to the other will be uniformly stretched or tensioned, and furthermore since the cords are stretched to double their length the effect of the elastic cords on the finished net will be essentially the same as already described in connection with the old process.

In the next step of the process the net strip unit or rope as it might be called while in its stretched condition has applied to it at lengths of about twenty-two inches two beads, buttons, metal fasteners, or the like, indicated at 15 throughout the length of the strip or rope. These fastening devices of whatever form are placed directly around the entire mass or rope of lace so as to not only surround the lace, but to positively grip the cords firmly together at the points so embraced. In my practice I employ for this purpose any standard or well known metal tipping machine, the tips being similar somewhat to sheet metal tips that are applied to the ends of shoe strings or other laces, although preferably they are of a smaller shorter nature than the ordinary shoe lace tip. Suffice it to say, however, that irrespective of the nature of the tips 15 or the means for applying them, they constitute devices for positively holding the two cords 12 together and with the intermediate portion of the lace likewise locked in place. After the tips 15 are applied in twos closely to each other the final act is simply to sever the net units from each other by clipping the fabric between each two tips 15, and thereby the finished nets as indicated in Fig. 4 are produced in complete form. In this connection it is to be noted that each tip 15 serves not only to fasten the ends of the elastic cords together, but also takes the place of the half hitches or knots employed in the old process. Obviously in the practice of this invention machinery may be employed to good advantage not only in the making of the lace and the weaving of the elastic cords therein while the lace is being woven, but also in the application of the tips 15 in a uniform manner to the net strip or rope. Consequently the operation is a very rapid one. I wish it to be distinctly understood, however, that while I preferably employ machinery for practically all of the work except the drawing of the threads 11, my process contemplates the making of the hair nets in essentially the way that I have herein set forth, even though any or all of the steps may be carried out by hand means.

I claim:

1. The herein described method of making lace hair nets comprising essentially the following steps: (1) making a strip of lace of the desired width for a net and including along its selvages elastic cords; (2) drawing out the elastic cords to double their length leaving the stretched portions of the cords in the strip from one end of the strip to the other; (3) fastening the ends of the lace strip to the cords and then treating the strip as a long string or rope with the cords collapsed close together with the lace between them; (4) applying positive fastening devices around the string or rope as described herein in closely related twos with sufficient fabric between each two to produce a single net, and (5) severing the fabric between each two fastening devices.

2. The herein described method of making lace hair nets comprising: (1) the manufacture of a piece of lace of any desired length and including a plurality of net strips arranged edge to edge and separably connected, there being introduced along the selvages of each strip during the making of the lace elastic cords; (2) fastening all of the ends of the cords at one end of the piece and withdrawing the opposite ends of the cords from the opposite end of the piece thereby putting the remaining portions of the cords in the lace under suitable tension; (3) fastening the portions of the cords at the opposite ends of the lace and removing the exposed portions of the cords therefrom; (4) separating the net strips from one another and treating the several strips so formed each with elastic cords along its edges as strings or ropes of fabric; (5) applying pairs of fasteners at uniform distances between pairs around the string or rope of fabric in stretched condition thereby binding the cords and other portions of the lace between them firmly and permanently together, and (6) severing the fabric throughout its length between the fasteners of each pair.

3. The herein described piece of lace fabric comprising the combination with parallel strips and means to attach adjacent edges of adjacent strips together, of a pair of elastic cords extending along the meeting edge of adjacent strips, one cord of each pair pertaining only to the edge of one strip independent of the other cord of the same pair.

4. In a piece of fabric of the nature set forth, the combination with adjacent parallel strips of material having removable means separably attaching adjacent strips to each other, of pairs of elastic cords extending parallel to each other along each meeting edge of adjacent strips and constituting permanent parts of the meeting edges of the several strips, after as well as before being separated.

5. The herein described hair net comprising a rectangular piece of lace having side selvage edges and end raw edges, elastic means extending along the selvage edges, and means embracing the raw end edges of the lace and locking the ends of the elastic means thereto.

RUDOLF SAENGER.